United States Patent [19]

Yano et al.

[11] Patent Number: 5,646,679

[45] Date of Patent: Jul. 8, 1997

[54] IMAGE COMBINING METHOD AND APPARATUS

[75] Inventors: Kotaro Yano, Yokohama; Katsumi Iijima, Hachioji, both of Japan

[73] Assignee: Canon Kabushiki Kaisha, Tokyo, Japan

[21] Appl. No.: 500,341

[22] Filed: Jun. 28, 1995

[30] Foreign Application Priority Data

Jun. 30, 1994 [JP] Japan ................... 6-148879

[51] Int. Cl.$^6$ ........................................ H04N 7/18
[52] U.S. Cl. .................... 348/47; 348/36; 348/42; 348/45; 348/218; 348/586
[58] Field of Search ................... 348/45, 47, 42, 348/36, 218, 586; H04N 7/00, 13/00, 15/00, 13/02, 5/225, 9/74

[56] References Cited

U.S. PATENT DOCUMENTS

| | | | |
|---|---|---|---|
| 4,825,393 | 4/1989 | Nishiya | 364/560 |
| 5,142,642 | 8/1992 | Sudo | 358/88 |
| 5,175,616 | 12/1992 | Milgram et al. | 348/47 |
| 5,253,302 | 10/1993 | Massen | 348/47 |
| 5,424,773 | 6/1995 | Saito | 348/47 |
| 5,432,543 | 7/1995 | Hasegawa | 348/45 |

*Primary Examiner*—Tommy P. Chin
*Assistant Examiner*—Diep Nhon Thanh
*Attorney, Agent, or Firm*—Morgan & Finnegan, LLP

[57] ABSTRACT

In image combining method of phototaking an object to be photographed by using a plurality of image taking systems with portions of fields of view thereof overlapping, and forming combined image information by combining pieces of image information obtained by the image taking systems, coordinates changing processing is performed by using the distance information of an object to be photographed, and image signals output from the respective image taking systems are compensated in accordance with the changed coordinates. One of the compensated image signals is selected with respect to a region where a far-distance portion of the object is concealed by a near-distance object, of the overlapping region of a combined image signal. With this operation, a plurality of image signals output from the respective image taking systems are combined into one image signal output in a state defined by an arbitrary object distance and the imaging magnification from an image taking system in which the viewpoint position and the optical axis direction are defined by the shift amount of the viewpoint position from each image taking system and the convergence angle of the optical axis.

6 Claims, 9 Drawing Sheets

TEMPORARY IMAGINARY PLANE $I_{L+R}$

IMAGE COMBINING METHOD AND APPARATUS

BACKGROUND OF THE INVENTION

1. Field of the Invention

The present invention relates to a multi-eye image pickup apparatus and, more particularly, to a multi-eye phototaking method and apparatus which provide a panoramic image having an arbitrary aspect ratio by combining a plurality of images.

2. Related Background Art

As a conventional aspect ratio changing scheme of changing the aspect ratio of a television screen, an aspect ratio changing scheme of trimming the upper and lower portions or left and right portions of a screen when image data is output is known. For example, such an aspect ratio changing scheme is used to change the aspect ratio (4:3) of an NTSC television screen to the aspect ratio (16:9) of an HD or ED2 television screen.

These aspect ratio changing schemes use part of a phototaken image. For this reason, especially when an object to be photographed is phototaken by an NTSC camera using an image sensor with an aspect ratio of 16:9, and the resultant image is output to an NTSC monitor with an aspect ratio of 4:3, the horizontal field angle decreases to about ⅓, although no problem is posed in terms of image quality.

A multi-eye image pickup apparatus for obtaining a high-resolution image by combining the overlapping regions of a plurality of images obtained by phototaking one object using a plurality of image taking systems is disclosed in, e.g., THE JOURNAL OF THE INSTITUTE OF IMAGE ELECTRONICS ENGINEERS OF JAPAN, 90-03-04, pp. 23–28. Also, a multi-eye image pickup apparatus for outputting an image with a large field angle by combining images obtained by coordinates changing processing of a plurality of input images is disclosed in, e.g., Japanese Laid-Open Patent Application No. 5-110926.

With the use of such a multi-eye image pickup apparatus or its application, a multi-eye image pickup apparatus can be obtained, which forms an image having an arbitrary aspect ratio by combining a plurality of images obtained by phototaking one object to be photographed using a plurality of image taking systems with portions of the fields of view of the image taking systems overlapping each other.

As in the multi-eye image pickup apparatus shown in FIG. 7, one object 101 to be photographed is phototaken by using two image taking systems (a left side image taking system $110_L$ and a right side image taking system $110_R$) with portions of the fields of view of the image taking systems overlapping each other, and a left side image $P_L$ obtained by the left side image taking system $110_L$ and a right side image $P_R$ obtained by the right side image taking system $110_R$ are combined with each other by a central processing unit (CPU) 120, thereby forming one image $P_{L+R}$ having an arbitrary aspect ratio.

The above conventional art, however, indicates no method of obtaining an image having a predetermined aspect ratio. Therefore, with the use of the scheme of trimming a combined image, a deterioration in image quality occurs.

In order to solve the above problem, "Multi-eye Image Pickup Apparatus" in Japanese Patent Application No. 5-223544 (U.S. Ser. No. 08/267,117 filed on Jun. 24, 1994) is disclosed which performs a phototaking operation by using a plurality of image taking systems with portions of the fields of view overlapping. In this image pickup apparatus, a plurality of image signals output from the respective image taking systems are combined into one image signal output in a state defined by an arbitrary object distance and the imaging magnification from an image taking system in which the viewpoint position and the optical axis direction are defined by the shift amount of the viewpoint position from each image taking system and the convergence angle of the optical axis. The present applicant also disclosed a method of obtaining an image exhibiting little deterioration in image quality and having undergone correction of distortion caused by convergence.

The above apparatus and method will be described below. FIG. 8 shows the basic arrangement of the above apparatus and method. This apparatus is constituted by two image taking systems, i.e., a right side image taking system $810_R$ and a left side image taking system $810_L$ as first and second imaging optical systems.

An object plane 801 is a plane common to the two image taking systems. A left side imaging optical system $811_L$ and a right side imaging optical system $811_R$ are imaging optical systems having equivalent specifications. In general, zoom lenses are used as these optical systems. A left side image sensor $812_L$ and a right side image sensor $812_R$ also have equivalent specifications. As these sensors, image pick-up tubes such as saticons or solid-state image pick-up elements such as CCDs are used. Optical axes $L_L$ and $L_R$ of these image taking systems are symmetrically inclined by about θ, respectively, with respect to a normal O–O' to the object plane 801 (a point O is located on the object plane 801) in such a manner that the phototaking fields of view overlap in a predetermined amount in accordance with the selected aspect ratio of a screen. Note that 2θ is the convergence angle. Object planes $802_L$ and $802_R$ are respectively conjugate to the image sensors $812_L$ and $812_R$ and are respectively inclined by θ with respect to the object plane 801. Points $O_L$ and $O_R$ are the intersections between the optical axes $L_L$ and $L_R$ and the object plane 801. Points $C_L$ and $C_R$ are the principal points of the imaging optical systems $811_L$ and $811_R$ (more specifically, the principal points on the object side). The imaging optical systems $811_L$ and $811_R$ include zoom lens groups and focusing lens groups, driving systems for driving these lens groups, and encoders for obtaining position information in the optical axis directions. In addition, each image taking system includes a mechanical system for rotating the image taking system within a plane including the optical axis, a driving system, and an encoder for detecting a rotational angle. A convergence angle controlling system sets a control target value of the convergence angle in accordance with an output signal from each encoder and performs convergence control to obtain an image having a predetermined aspect ratio.

A method of determining a control target value of the convergence angle will be described below with reference to FIGS. 8 and 9.

Let β be the imaging magnification of the left side imaging optical system $811_L$ and the right side imaging optical system $811_R$ shown in FIG. 8, z be the object distance (the distance between the point object and the point $C_L$ and the distance between the point object and the point $C_R$), and 2d be the distance (base line length) between the point $C_L$ and the point $C_R$. Assume that the viewpoint is set at a point on the normal O–O' separated from the object plane 801 toward the point O' by the distance z, and a virtual plane is set such that the virtual imaging magnification at the viewpoint is β' (i.e., the distance between the viewpoint and the image plane is β'z'). In this case, a temporary imaginary plane $I_{L+R}$ is obtained by combining an image plane $I_L$ of the left side image sensor $812_L$ and an image plane $I_R$ of the right side image sensor $812_R$, as shown in FIG. 9.

Referring to FIG. 9, points $A_L$, $B_L$, $C_L$, and $D_L$ are the diagonal points of the image plane $I_L$ of the left side image sensor $812_L$. These points respectively correspond to points $A_L'$, $B_L'$, $C_L'$, and $D_L'$ on the temporary imaginary plane $I_{L+R}$. Points $A_R$, $B_R$, $C_R$, and $D_R$ are the diagonal points of the image plane $I_R$ of the right side image sensor $812_R$. These points respectively correspond to points $A_R'$, $B_R'$, $C_R'$, and $D_R'$ on the temporary imaginary plane $I_{L+R}$. In addition, points $E_L$ and $F_L$ are points on the upper and lower sides of the image plane $I_L$ of the left side image sensor $812_L$. These points correspond to the center of the overlapping region. Points $E_R$ and $F_R$ are points on the upper and lower sides of the image plane $I_R$ of the right side image sensor $812_R$. These points correspond to the center of the overlapping region. Both the points $E_L$ and $E_R$ correspond to a point E' on the temporary imaginary plane $I_{L+R}$. Both the points $F_L$ and $F_R$ correspond to a point F' on the temporary imaginary plane $I_{L+R}$.

Assume that the centers of the image planes $I_L$ and $I_R$ are origins, and the horizontal and vertical directions in FIG. 9 are x- and y-axes, respectively. In this case, if coordinate systems are defined on the image planes $I_L$ and $I_R$, an image point $(x_R, y_R)$ on the image plane $I_R$ of the right side image sensor $812_R$ corresponds to an image point $(x_R', y_R')$, on the temporary imaginary plane $I_{L+R}$, which is given by equations (1) and (2):

$$x_R'=\{(x_R \cos \theta + \beta z \sin \theta + \beta d)/(-x_R \sin \theta + \beta z')\} \times \beta' z' \quad (1)$$

$$y_R'=\{y_R/(-x_R \sin \theta + \beta z')\} \times \beta' z' \quad (2)$$

In addition, an image point $(x_L, y_L)$ on the image plane $I_L$ of the left side image sensor $812_L$ corresponds to an image point $(x_L', y_L')$, On the temporary imaginary plane $I_{L+R}$, which is given by equations (3) and (4):

$$x_L'=\{(x_L \cos \theta - \beta z \sin \theta - \beta d)/(x_L \sin \theta - \beta z')\} \times \beta' z' \quad (3)$$

$$y_L'=\{y_L/(x_L \sin \theta + \beta z')\} \times \beta' z' \quad (4)$$

By performing geometrical transform processing like the one indicated by equations (1) to (4), images on a plurality of image sensors, which cause convergence, can be combined into an image on one temporary imaginary plane. Therefore, with the use of an image combining/transform processing portion (not shown) for performing such geometrical transform processing, an image having undergone correction of distortion caused by convergence can be obtained.

In the above method and apparatus, the following problems are posed when an object to be photographed has a distance distribution in which the object includes an object at a greatly different distance from the background from the rest of the objects.

Assume that an object A is located at a distance $z_A$, as shown in FIG. 8. In this case, if geometrical transform processing based on equations (1) to (4) is performed, the object position on a temporary imaginary plane is shifted by the difference between the object distance z and the object distance $z_A$. In this case, the positions $(x_R'', y_R'')$ and $(x_L'', y_L'')$, on an ideal temporary imaginary plane for forming a combined image free from any position shift, which correspond to the image point $(x_R, y_R)$ on the image plane of the first image sensor and the image point $(x_L, y_L)$ on the image plane of the second image sensor, respectively, are given by $$x_R''=\{[x_R \cos \theta + \beta z \sin \theta + \beta d(z/z_A)]/[-x_R \sin \theta + \beta z(1-z/z_A) \cos \theta + \beta z'(z/z_A)]\} \times \beta' z' \quad (5)$$

$$y_R''=\{y_R/[-x_R \sin \theta + \beta z(1-z/z_A) \cos \theta + \beta z'(z/z_A)]\} \times \beta' z' \quad (6)$$

$$x_L''=\{[x_L \cos \theta - \beta z \sin \theta - \beta d(z/z_A)]/[x_L \sin \theta + \beta z(1-z/z_A) \cos \theta + \beta z'(z/z_A)]\} \times \beta' z' \quad (7)$$

$$y_L''=\{y_L/[x_L \sin \theta + \beta z(1-z/z_A) \cos \theta + \beta z'(z/z_A)]\} \times \beta' z' \quad (8)$$

Consequently, a positional shift occurs owing to the influence of the object distance. The corresponding shift amounts are respectively given by $$\Delta x_R = x_R'' - x_R', \ \Delta y_R = y_R'' - y_R', \ \Delta x_L = x_L'' - x_L', \ \Delta y_L = y_L'' - y_L' \quad (9)$$

For this reason, an arbitrary point on the object A may be shifted from an ideal position a by $(\Delta x_R, \Delta x_L)$ in the x direction, and by $(\Delta y_R, \Delta y_L)$ in the y direction, resulting in a deterioration in the image quality of a combined image.

In addition, since the background is concealed by the object A in the hatched regions in the overlapping region in FIG. 10, these hatched regions are not phototaken by both the first and second image sensors, although the regions are included in the overlapping region. Therefore, a portion IL in FIG. 10 is phototaken as only an image for the first image sensor; and a portion IR, as only an image for the second image sensor. Even if, therefore, images having undergone coordinates changing processing are combined, the object portion may overlap the background portion, resulting in a deterioration in the image quality of the combined image.

SUMMARY OF THE INVENTION

The present invention has been made in consideration of the above situation, and has as its object to provide an image combining method and apparatus which can obtain a panoramic image having an arbitrary aspect ratio with little deterioration in image quality.

According to the present invention, there is provided an image combining method of phototaking an object to be photographed by using a plurality of image taking systems with portions of fields of view thereof overlapping, and forming combined image information by combining pieces of image information obtained by the image taking systems, comprising the steps of extracting corresponding point information between the pieces of image information, calculating distance information by using optical information in each of the image taking systems and the corresponding point information, sequentially generating two-dimensional coordinates of a display image based on the combined image information, changing the two-dimensional coordinates to two-dimensional coordinates of each piece of image information by using the optical information and the distance information, performing compensation processing for each piece of image information on the basis of the changed two-dimensional coordinates for each piece of image information, determining an occlusion portion in which a far-distance portion of the object is concealed by a near-distance portion, of an overlapping region of phototaken images on the basis of the corresponding point information, and selecting one of pieces of compensated image information with respect to the occlusion portion in forming combined image information by combining the pieces of compensated image information.

In this case, in selecting compensated image information with respect to the occlusion portion, compensated image information exhibiting the least occlusion portion may be selected from the pieces of compensated image information.

According to the present invention, there is provided an image combining apparatus for phototaking an object to be photographed by using a plurality of image taking systems with portions of fields of view thereof overlapping, and forming combined image information by combining pieces of image information obtained by the image taking systems, comprising corresponding points extracting means for extracting corresponding point information between the pieces of image information, distance information calculating means for calculating distance information by using optical information in each of the image taking systems and the corresponding point information, address generating means for sequentially generating two-dimensional coordinates of a display image based on the combined image information, coordinates changing means for changing the two-dimensional coordinates to two-dimensional coordinates of each piece of image information by using the optical information and the distance information, image information compensating means for performing compensation processing for each piece of image information on the basis of the changed two-dimensional coordinates for each piece of image information, determining means for determining an occlusion portion in which a far-distance portion of the object is concealed by a near-distance portion, of an overlapping region of phototaken images on the basis of the corresponding point information, and selecting means for selecting one of pieces of compensated image information with respect to the occlusion portion in forming combined image information by combining the pieces of compensated image information.

In this case, in selecting compensated image information with respect to the occlusion portion, compensated image information exhibiting the least occlusion portion may be selected from the pieces of compensated image information.

In addition, the apparatus may further comprise image correlating means for dividing each compensated image information into small regions, and determining an occlusion portion in accordance with a similarity between corresponding small regions of the respective pieces of compensated image information. Furthermore, in this case as well, in selecting compensated image information with respect to the occlusion portion, compensated image information exhibiting the least occlusion portion may be selected from the pieces of compensated image information.

Of an overlapping region, a region where a far-distance portion of an object to be photographed is concealed by a near-distance portion is not necessarily phototaken by all the image taking systems. For this reason, if images phototaken by the respective image taking systems are combined, a deterioration in image quality occurs.

In the image combining method and apparatus of the present invention, in performing image combining processing of the above regions, an image obtained by one image taking system is selected. Therefore, no deterioration in the image quality of a combined image occurs.

When an image taking system exhibiting the minimum concealed region is to be selected in image selection processing, an actual phototaken image is used mostly. Therefore, an accurate image closer in appearance to the actual image can be obtained upon combining processing.

With the use of an image correlation portion, a compensated image having higher correlation is selected. Even if, therefore, corresponding point extraction processing is not completely performed, a combined image having undergone smooth compensation processing and having less distortion can be obtained.

DETAILED DESCRIPTION OF THE PREFERRED EMBODIMENTS

Figure 1:
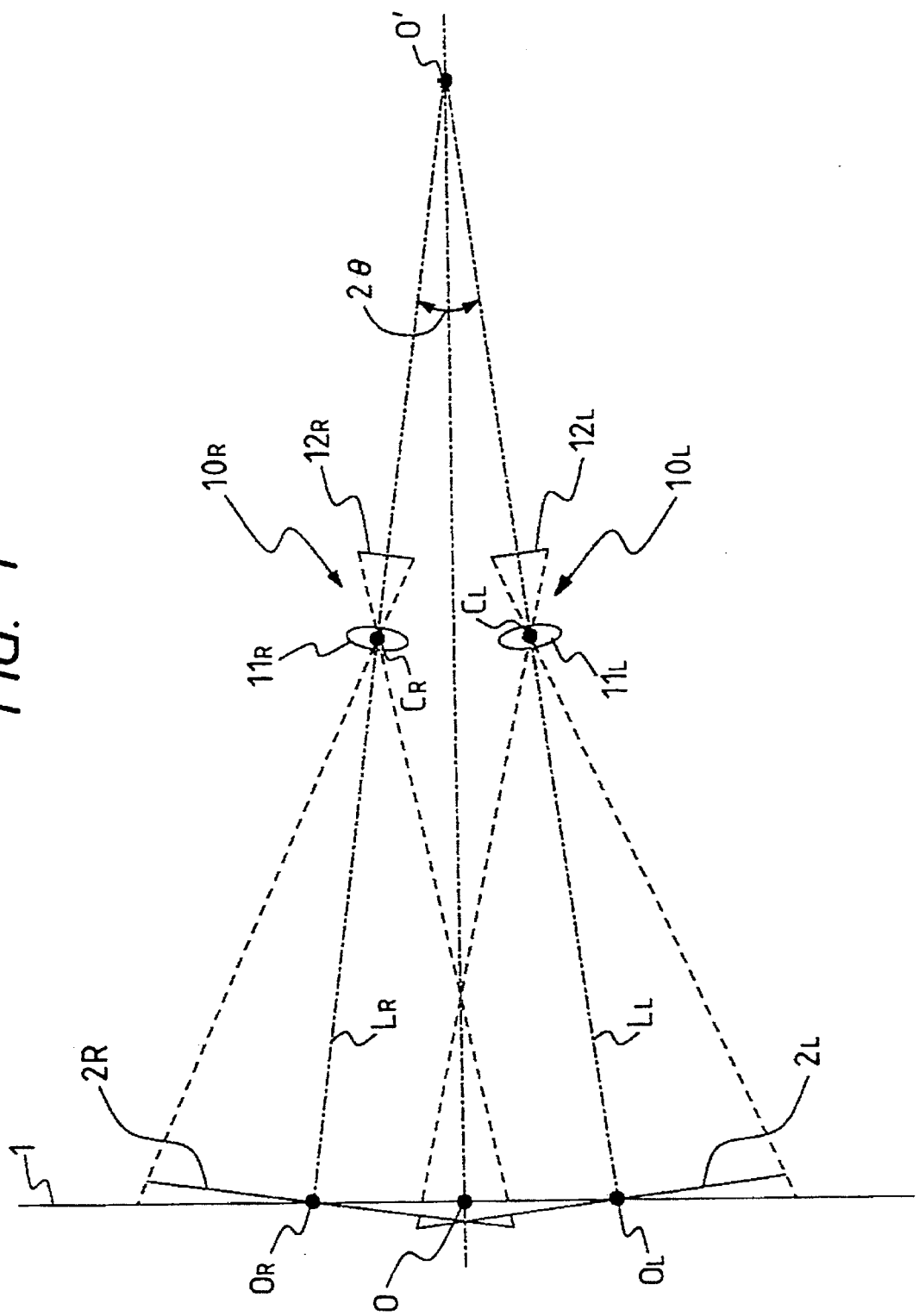
FIG. 1 is a view showing the basic positions of image taking systems in a multi-eye image pickup apparatus according to an embodiment of the present invention.

FIG. 1 shows the basic positions of image taking systems in a multi-eye image pickup apparatus according to an embodiment of the present invention.

This embodiment is basically designed to perform image combining processing by using the same multi-eye image pickup apparatus disclosed in Japanese Patent Application No. 5-223544. Referring to FIG. 1, an object plane 1, a right side object plane $2_R$, a left side object plane $2_L$, a right side image taking system $10_R$, a left side image taking system $10_L$, a right side imaging optical system $11_R$, a left side imaging optical system $11_L$, a right side image sensor $12_R$, and a left side image sensor $12_L$ are respectively identical to the object plane 801, the object plane $802_R$, the object plane $802_L$, the right side image taking system $810_R$, the left side image taking system $810_L$, the right side imaging optical system $811_R$, the left side imaging optical system $811_L$, the right side image sensor $812_R$, and the left side image sensor $812_L$ shown in FIG. 8. Therefore, a description of these components will be omitted.

The multi-eye image pickup apparatus of this embodiment includes two image taking systems, i.e., the left side image taking system $10_L$ and the right side image taking system $10_R$. In this case, the left side image taking system $10_L$ comprises the left side imaging optical system $11_L$ constituted by a zoom lens, and the left side image sensor $12_L$ constituted by an image pick-up tube such as a saticon or a solid-state image pick-up element such as a CCD. The right side image taking system $10_R$ has specifications equivalent to those of the left side image taking system $10_L$ and comprises the right side imaging optical system $11_R$ constituted by a zoom lens, and the right side image sensor $12_R$ constituted by an image pick-up tube such as a saticon or a solid-state image pick-up element such as a CCD.

As the left side image sensor $12_L$ and the right side image sensor $12_R$, a single-tube (single-plate) type sensor like the one shown in FIG. 1 may be used. Alternatively, a two-tube (two-plate) or three-tube (three-plate) type sensor may be used through a color separation optical system.

Figure 8:
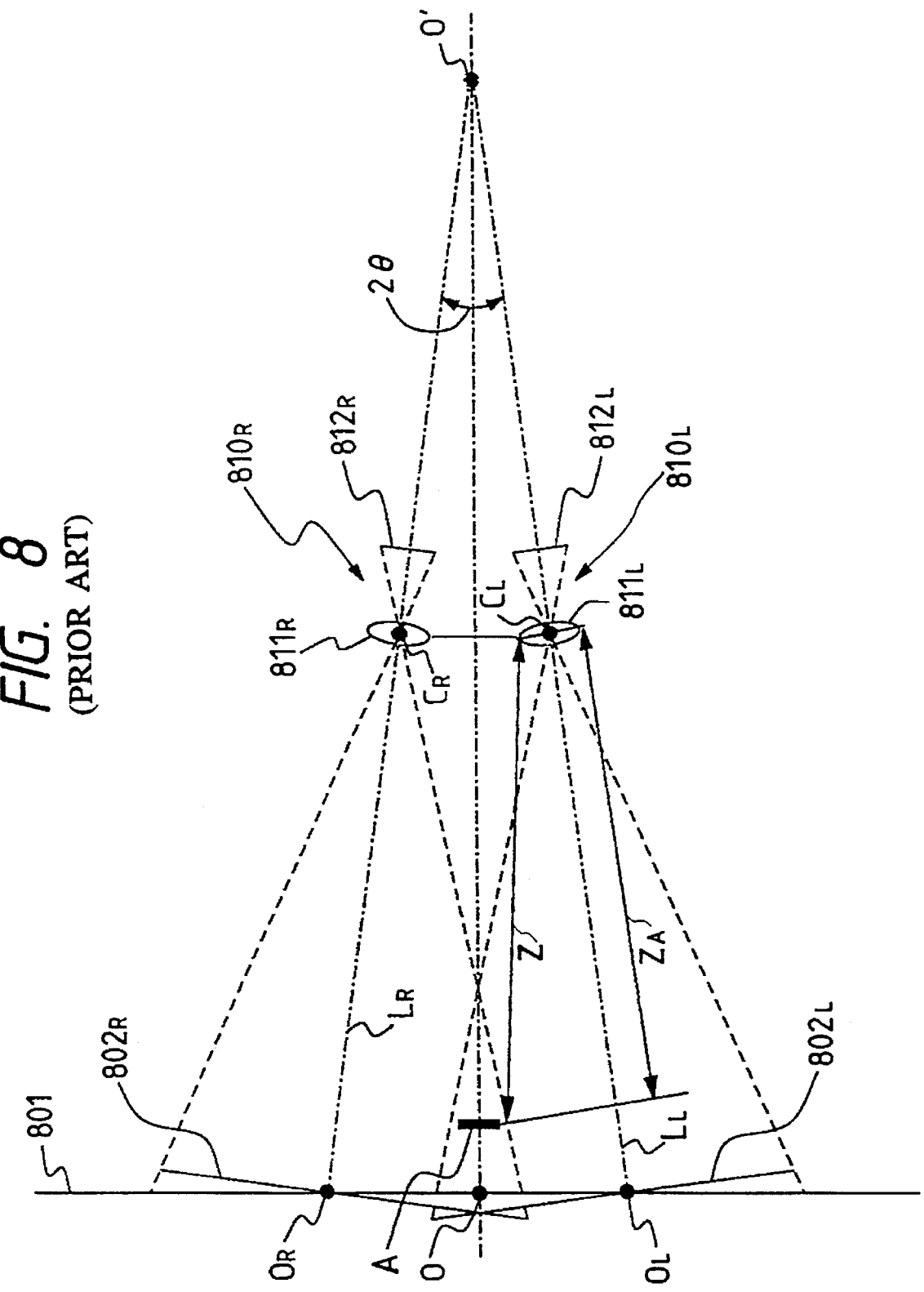
FIG. 8 is a view showing the basic positions of multi-eye image taking systems.

As described with reference FIG. 8, which shows a similar arrangement, optical axes $L_L$ and $L_R$ of the left and right side imaging optical systems $11_L$ and $11_R$ are symmetrically inclined by about θ, respectively, with respect to a normal O-O" to the object plane 1 in such a manner that the imaging fields of view overlap in a predetermined amount in accordance with the selected aspect ratio of a screen. Therefore, the left side object plane $2_L$ conjugate to the left side image sensor $12_L$ and the right side object plane $2_R$ conjugate to the right side image sensor $12_R$ are respectively inclined by the angle θ with respect to the object plane 1.

Figure 2:
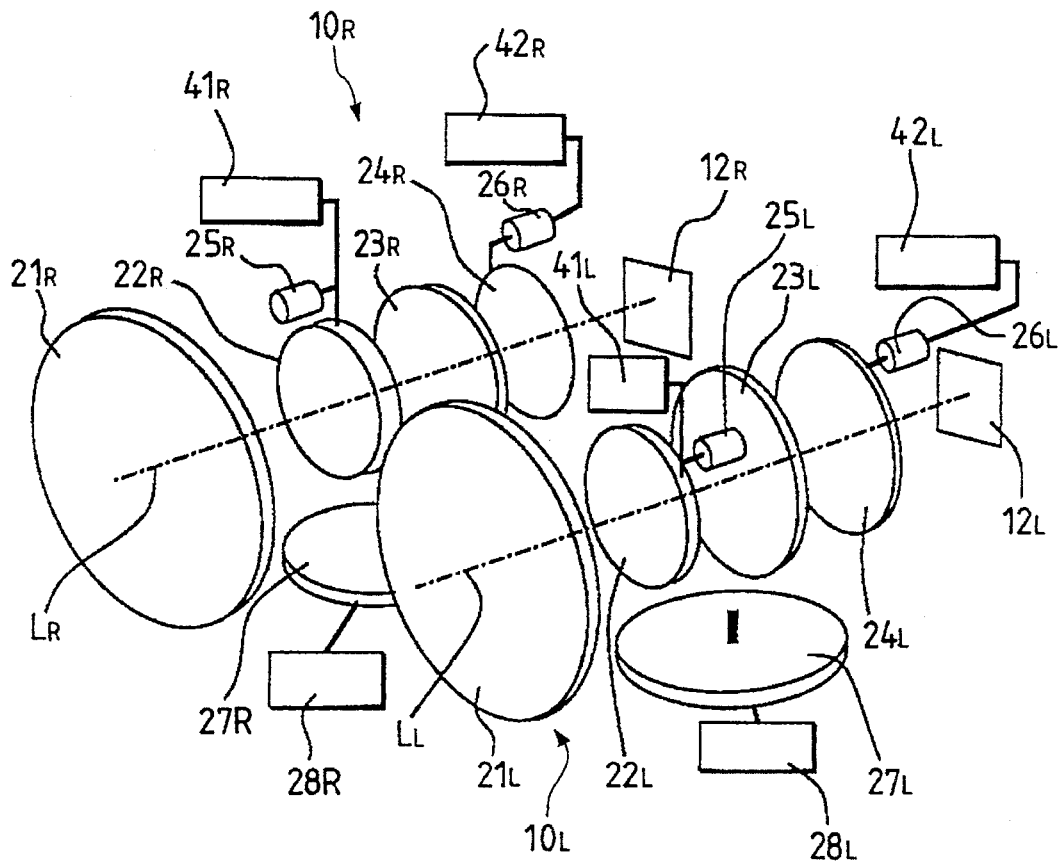
FIG. 2 is a schematic view showing the arrangements of right and left side imaging optical systems in FIG. 1.

The arrangements of the left side imaging optical system $11_L$ and the right side imaging optical system $11_R$, which are based on the basic positions described above, will be described next with reference to FIG. 2. FIG. 2 shows the schematic arrangements of the left and right side imaging optical systems shown in FIG. 1.

The left side imaging optical system $11_L$ comprises lens groups $21_L$ to $24_L$ including a zoom lens group $22_L$ and a focusing lens group $24_L$, a zooming motor $25_L$ as a driving system for driving the zoom lens group $22_L$, a focusing motor $26_L$ as a driving system for driving the from an output signal from the zooming encoder $41_L$. A focusing encoder $42_L$ is used to obtain the position information of each lens group arranged in the focusing lens group $24_L$ in the optical axis direction (the direction of the optical axis $L_L$). The object distance for the left side imaging optical system $11_L$ can be obtained from an output signal from the focusing encoder $42_L$. As the zooming encoder $41_L$ and the focusing encoder $42_L$, members to be externally mounted, such as potentiometers, may be used. Alternatively, a driving system itself, such as a pulse motor, may detect the position information of each lens in the optical axis direction by a driving method.

The right side imaging optical system $11_R$ has the same arrangement as that of the left side imaging optical system $11_L$. Note that a zooming motor $25_R$ of the right side imaging optical system $11_R$ is driven by the above zooming controlling portion to have the same focal length as that of the left side imaging optical system $11_L$. A focusing motor $26_R$ of the right side imaging optical system $11_R$ is driven by the above zooming controlling portion to focus the right side imaging optical system $11_R$ at the same object distance as that at which the left side imaging optical system $11_L$ is focused.

A convergence angle controlling system 50 of the multi-eye image pickup apparatus of this embodiment focusing lens group $24_L$, a mechanical system (not shown) and a driving system (convergence angle motor $27_L$) which serve to integrally rotate the left side imaging optical system $11_L$ and the left side image sensor $12_L$ within a plane including the optical axis $L_L$, and a convergence angle encoder $28_L$ for detecting the rotational angle of the convergence angle motor $27_L$. As the convergence angle encoder $28_L$, a member to be externally mounted, such as a rotary encoder, may be used. Alternatively, a driving system itself, such as a pulse motor, may detect the rotational angle by a driving method.

The zooming motor $25_L$ of the left side imaging optical system $11_L$ is driven by a zooming controlling portion (not shown), to which a zooming signal is externally input, to make the left side imaging optical system $11_L$ have a predetermined focal length. The focusing motor $26_L$ is driven by a zooming controlling portion (not shown), to which a focusing signal is externally input, to focus the left side imaging optical system $11_L$ at a predetermined object distance.

Figure 3:
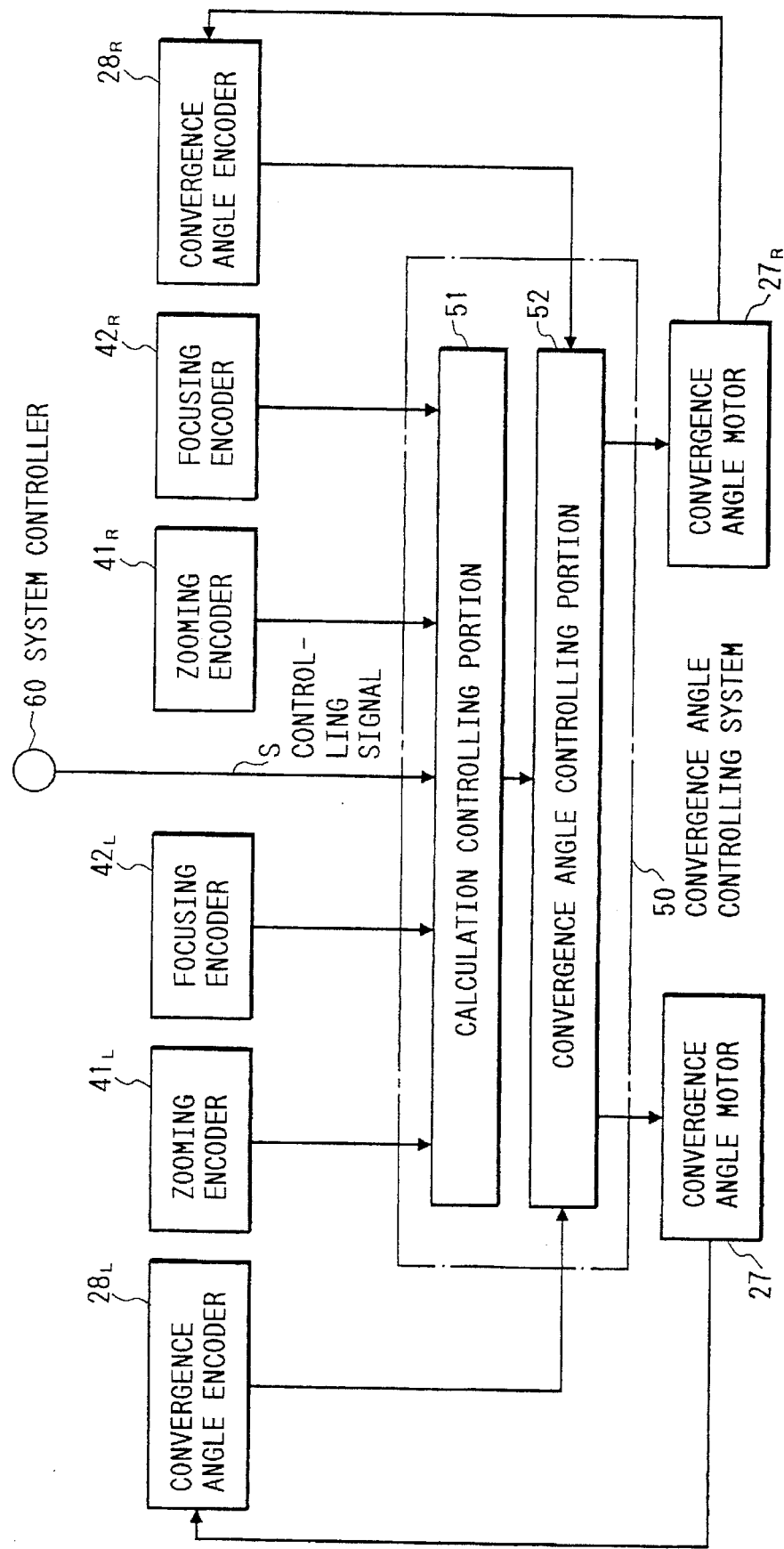
FIG. 3 is a block diagram showing the arrangement of a convergence angle controlling system in the multi-eye image pickup apparatus according to the embodiment of the present invention.

A zooming encoder $41_L$ of the left side imaging optical system $11_L$ is used to obtain the position information of each lens group arranged in the zoom lens group $22_L$ in the optical axis direction (the direction of the optical axis $L_L$). The focal length of the left side imaging optical system $11_L$ can be obtained will be described next with reference to FIG. 3. FIG. 3 is a block diagram showing the arrangement of a convergence angle controlling system of the multi-eye image pickup apparatus according to an embodiment.

The convergence angle controlling system 50 is constituted by a calculation controlling portion 51 for determining a control target value of the convergence angle such that an image formed upon combining/changing processing has a predetermined aspect ratio in accordance with optical parameters representing at least the imaging magnification and the object distance of the right and left imaging optical systems $11_R$ and $11_L$, and a convergence angle controlling portion 52 for performing convergence angle control in accordance with an output signal from the calculation controlling portion 51.

The calculation controlling portion 51 receives an output signal from the zooming encoder $41_L$ of the left side imaging optical system $11_L$, an output signal from the focusing encoder $42_L$, an output signal from a zooming encoder $41_R$ of the right side imaging optical system $11_R$, an output signal from a focusing encoder $42_R$, and a controlling signal S from a system controller 60. The convergence angle controlling portion 52 receives an output signal from the convergence angle encoder $28_L$ of the left side imaging optical system $11_L$, an output signal from a convergence angle encoder $28_R$ of the right side imaging optical system $11_R$, and an output signal from the calculation controlling portion 51. Note that the convergence angle motor $27_L$ of the left side imaging optical system $11_L$ and the convergence angle encoder $27_R$ of the right side imaging optical system $11_R$ are respectively driven by output signals from the convergence angle controlling portion 52.

When the zoom lens group $22_L$ is driven by the zooming motor $25_L$ of the left side imaging optical system $11_L$, an output signal from the zooming encoder $41_L$, which represents the position information of each lens group arranged in the zoom lens group $22_L$ in the optical axis direction, is input to the calculation controlling portion 51. When a zoom lens group $22_L$ is driven by the zooming motor $25_R$ of the right side imaging optical system $11_R$, an output signal from the zooming encoder $41_R$, which represents the position information of each lens group arranged in the zoom lens group $22_R$, is input to the calculation controlling portion 51.

When the focusing lens group $24_L$ is driven by the focusing motor $26_L$ of the left side imaging optical system $11_L$, an output signal from the focusing encoder $42_L$, which represents the position information of each lens group arranged in the focusing lens group $24_L$ in the optical axis direction, is input to the calculation controlling portion 51. When a focusing lens group $24_R$ is driven by the focusing motor $26_R$ of the right side imaging optical system $11_R$, an output signal from the focusing encoder $42_R$, which represents the position information of each lens group arranged in the focusing lens group $24_R$ in the optical axis direction, is input to the calculation controlling portion 51.

Upon reception of the controlling signal S commanding rotation of the optical axes of the left and right side imaging optical systems $11_L$ and $11_R$ from the system controller 60, the calculation controlling portion 51 forms a control target value of the convergence angle 2θ in accordance with output signals from the zooming encoders $41_L$ and $41_R$ and output signals from the focusing encoders $42_L$ and $42_R$, and outputs an output signal representing the formed control target value to the convergence angle controlling portion 52.

The convergence angle controlling portion 52 compares the output signal from the calculation controlling portion 51 with output signals from the convergence angle encoders $28_L$ and $28_R$, and forms output signals for driving the convergence angle motors $27_L$ and $27_R$ so as to make the output signals from the convergence angle encoders $28_L$ and $28_R$ coincide with the formed target value.

Figure 9:
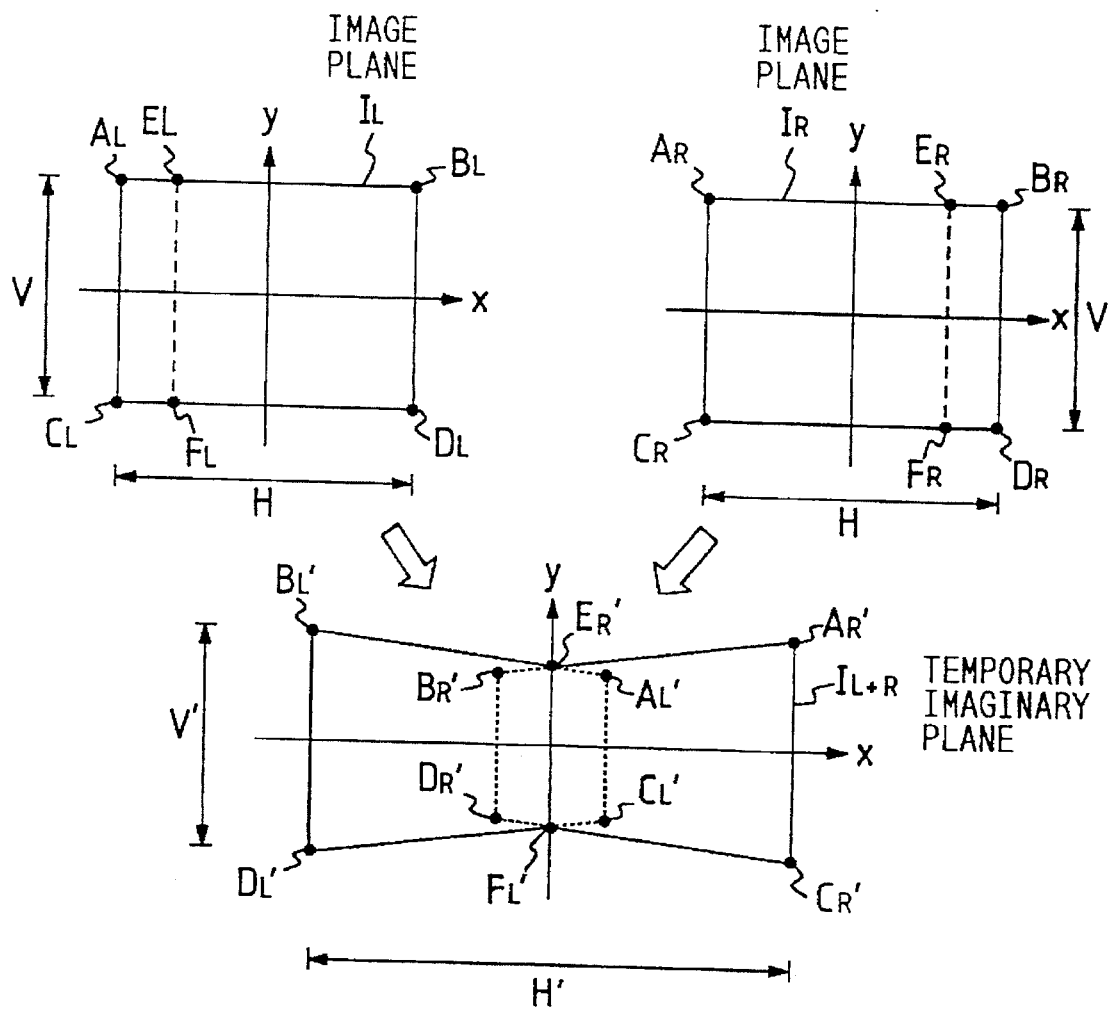
FIG. 9 is a view for explaining a method of forming a control target value of the convergence angle.

In the above multi-eye image pickup apparatus of this embodiment, the control target value is determined by the same method as that used in the prior art described with reference to FIG. 9.

Images on a plurality of image sensors, which have convergence, can be combined into one image on a temporary imaginary plane by performing geometrical changing processing like the one indicated by equations (1) to (4). Therefore, with the use of an image combining/changing processing portion (not shown) for performing such geometrical changing processing, an image having undergone correction of distortion caused by convergence can be obtained.

In addition, this image combining/changing processing portion serves as a portion for combining a plurality of image signals output from the respective image taking systems into one image signal output in a state defined by an arbitrary object distance and the imaging magnification from an image taking system in which the viewpoint position and the optical axis direction are defined by the shift amount of the viewpoint position from each image taking system and the convergence angle of the optical axis.

If the size of the image plane $I_L$ of the left side image sensor $12_L$ and an image plane $I_R$ of the right side image sensor $12_R$ is H×V (aspect ratio H/V), and the size of a temporary imaginary plane $I_{L+R}$ is H'×V' (aspect ratio H'/V'), a length H' of the temporary imaginary plane $I_{L+R}$ in the horizontal direction can be calculated by obtaining the x-coordinates of points $A_R'$ and $B_L'$ after changing processing of points $A_R$ and $B_L$ from equations (1) and (3). In addition, a length V' of the temporary imaginary plane $I_{L+R}$ in the vertical direction can be calculated by obtaining the y-coordinates of the point $B_L'$ and a point $D_L'$ after changing processing of the point $B_L$ and a point $D_L$ from equations (2) and (4). The aspect ratio of the temporary imaginary plane $I_{L+R}$, which is obtained in this manner, is expressed by equation (10):

$$H'/V' = |\sin(\theta+\omega)/\sin(\omega) - 2\beta d/H| \times H/V \quad (10)$$

where $\omega = \tan^{-1}[-H/(2\beta z)]$: half field angle of image taking system in horizontal direction.

If, therefore, both the size H×V of the image planes $I_L$ and $I_R$ of the left and right side image sensors $12_L$ and $12_R$ and a base line length 2d are constant, equation (10) can be rewritten into equation (11) below:

$$\theta = f(H'/V', \beta, z) \quad (11)$$

That is, the convergence controlling angle θ for determining the aspect ratio H'/V' of the temporary imaginary plane $I_{L+R}$ is determined by an imaging magnification β and an object distance z.

The calculation controlling portion 51 shown in FIG. 3 calculates the average value of output signals from the zooming encoders $41_L$ and $41_R$ and the average value of output signals from the focusing encoders $42_L$ and $42_R$, and obtains the imaging magnification β from the two calculated average values by using optical parameters for the imaging optical systems $11_L$ and $11_R$ (e.g., the focal lengths and principal point intervals of the lens groups constituting the imaging optical systems $11_L$ and $11_R$). Subsequently, the control target value of the convergence angle is calculated in accordance with the imaging magnification β and the object distance z according to equation (11) in such a manner that the aspect ratio H'/V' of the temporary imaginary plane $I_{L+R}$ becomes a predetermined aspect ratio. The calculated control target value of the convergence angle is sent to the convergence angle controlling portion 52.

In this case, the average value of the output signals from the zooming encoders $41_L$ and $41_R$ and the average value of the output signals from the focusing encoders $42_L$ and $42_R$ are obtained. However, the output signal from one of the zooming encoders $41_L$ and $41_R$ and the output from the one of the focusing encoders $42_L$ and $42_R$ may be used. A table of the convergence controlling angle θ corresponding to the imaging magnification β and the object distance z may be prepared in the calculation controlling portion 51, and the control target value of the convergence angle may be obtained by referring to this table. Alternatively, the relationship between the imaging magnification β, the object distance z, and the convergence controlling angle θ may be approximated by a simple polynomial, and the coefficients of this polynomial may be stored in the calculation controlling portion 51, thereby calculating the convergence controlling angle θ.

Figure 4:
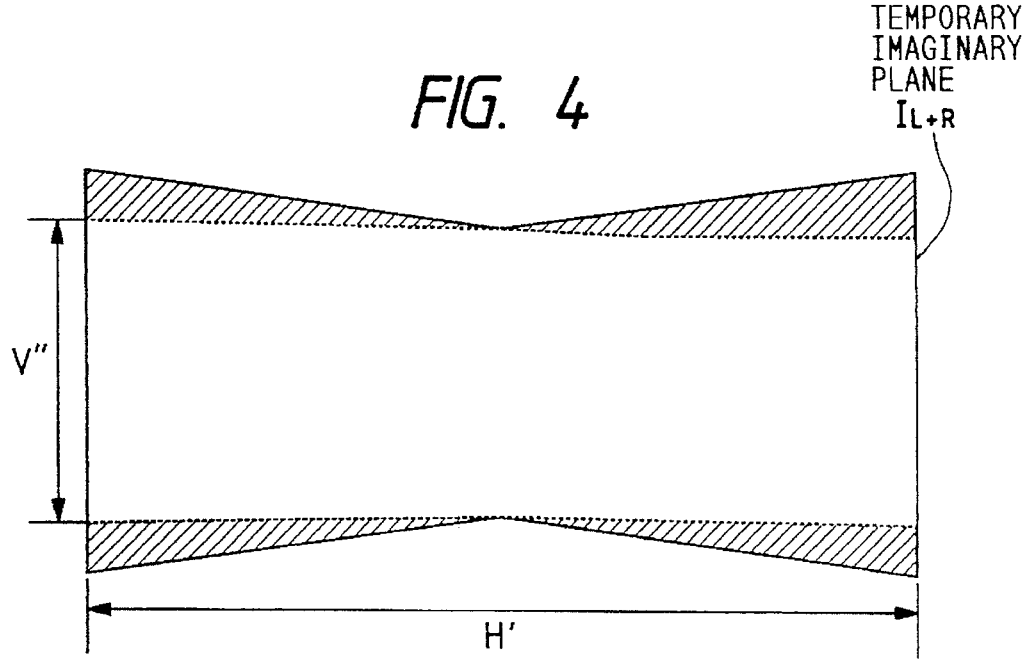
FIG. 4 is a view for explaining an image formed after combining processing.

In the above-described manner, an image having a predetermined aspect ratio can be obtained. In this case, since no trimming is required, and an overlapping region can be set to be as large as possible, a high-quality image can be obtained. As shown in FIG. 4, an image (temporary imaginary plane $I_{L+R}$) having undergone combining processing exhibits a slightly distorted rectangular region. For this reason, in displaying an image having an aspect ratio of 16:9 on an HD monitor or the like, a frame line may be displayed along the outline of the frame.

Figure 5:
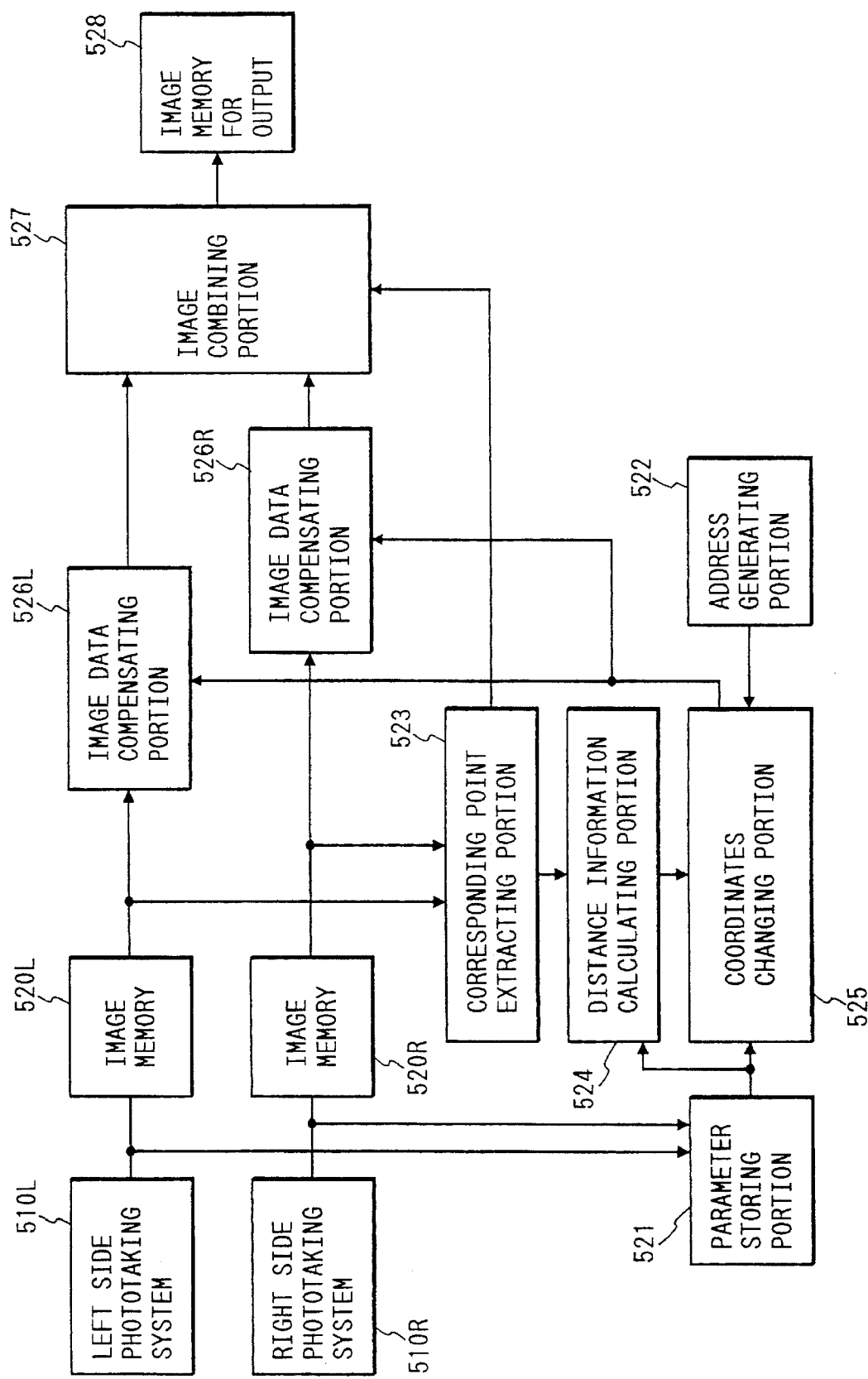
FIG. 5 is a block diagram showing the arrangement of an image combining/changing processing portion in the first embodiment of the present invention.

FIG. 5 is a block diagram showing the arrangement of the main part of an image combining apparatus according to the first embodiment of the present invention. A left side image taking system 510L and a right side image taking system 510R correspond to the image taking systems whose basic positions are shown in FIG. 1. The convergence angle θ is controlled by the convergence angle controlling system shown in FIG. 3 to obtain an image having a predetermined aspect ratio, and right and left images are simultaneously phototaken. The remaining portion corresponds to an image combining/changing processing portion. The arrangement and operation of this portion will be described below.

Image memories 520L and 520R are storing portions for storing left and right images as digital image data. A parameter storing portion 521 is a storing portion for storing a base line length 2d, the convergence angle θ, an imaging magnification β, and an object distance z as parameters of the image taking system, and an imaging magnification β' and an object distance z' as those of a virtual imaging system for an output image. A small area of the image memory 520L is stored as a template in a corresponding point extracting portion 523. The template is offset and translated to perform template matching with the image data in the image memory 520R, thereby detecting the coordinates ($x_R, y_R$) of the right image which correspond to the coordinates ($x_L, y_L$) of the left image. A distance information calculating portion 524 calculates distance information Z from the coordinates ($x_L, y_L$) and ($x_R, y_R$) of the left and right images, as corresponding point information in the corresponding point extracting portion 523, and the parameters stored in the parameter storing portion 521, i.e., the base line length 2d, the convergence angle θ, the imaging magnification β, the object distance z, and the imaging magnification β' and the object distance z' of the virtual imaging system for an output image.

An address generating portion 522 sequentially generates the two-dimensional coordinates of an image to be output, and supplies them to a coordinates changing portion 525. The coordinates changing portion 525 changes the addresses generated by the address generating portion 522 in accordance with the parameters of the image taking system, stored in the parameter storing portion 521, and the distance information Z, and obtains the two-dimensional coordinates of the left and right images stored in the image memories 520L and 520R.

Image data compensating portions 526L and 526R perform compensation processing for the left and right image data stored in the image memories 520L and 520R in accordance with the two-dimensional coordinates having undergone changing processing in the coordinates changing portion 525, and output the compensated image data to an image combining portion 527. The image combining portion 527 performs image combining processing in accordance with the compensated image data and the result obtained by the corresponding point extracting portion 523, and outputs image data having undergone combining processing to an image memory 528 for output. The above-described overall operation of the system is controlled by a system controlling portion (not shown).

Processing in the coordinates changing portion 525 will be described. Let (x',y') be coordinates within an output image plane which are sent from the address generating portion 522. Then, the coordinates $(x_L,y_L)$ and $(x_R,y_R)$ of the left and right images are obtained by inverse transformation (θ→−θ; d→−d) of equations (5) to (8) according to the following equations (12) to (15):

$$x_L = \{[x' \cos\theta - \beta'z' \sin\theta - \beta'd(z'/Z)]/[x' \sin\theta + \beta'z'(1-z'/Z) \cos\theta + \beta'z(z'/Z)]\} \times \beta z \quad (12)$$

$$y_L = \{y'/[x' \sin\theta + \beta'z'(1-z'/Z) \cos\theta + \beta'z(z'/Z)]\} \times \beta z \quad (13)$$

$$x_R = \{[x' \cos\theta + \beta'z' \sin\theta + \beta'd(z'/Z)]/[-x' \sin\theta + \beta'z'(1-z'/Z) \cos\theta + \beta'z(z'/Z)]\} \times \beta z \quad (14)$$

$$y_L = \{y'/[-x' \sin\theta + \beta'z'(1-z'/Z) \cos\theta + \beta'z(z'/Z)]\} \times \beta z \quad (15)$$

That is, equations (12) to (15) are calculated in accordance with the parameters stored in the parameter storing portion 521, i.e., the base line length 2d, the convergence angle θ, the imaging magnification β, and the object distance z of the image taking system, the imaging magnification β' and the object distance z' of the virtual imaging system for an output image, and the output Z from the distance information calculating portion 524, and the coordinates $(x_L,y_L)$ and $(x_R,y_R)$ of the left and right images are respectively sent to the image data compensating portions 526L and 526R.

Figure 10:
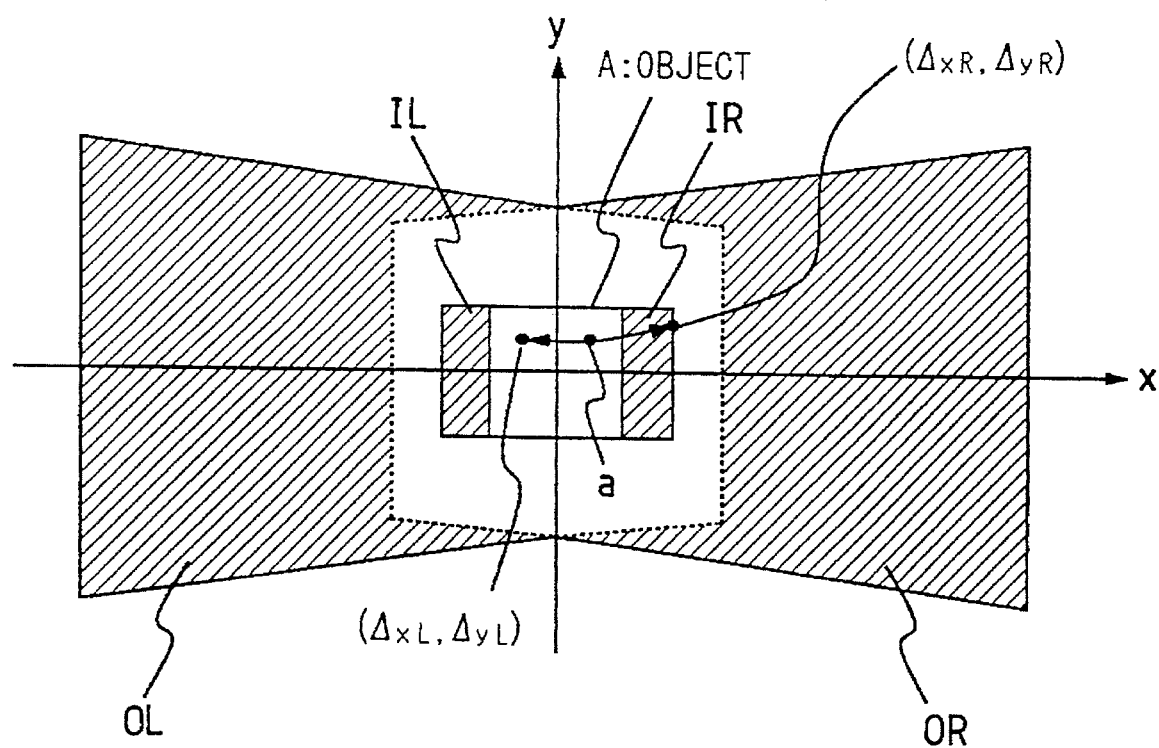
FIG. 10 is a view for explaining an image formed after combining processing.

Processing in the image combining portion 527 will be described next. An output image includes four types of regions indicated by the hatched portions in FIG. 10 as well as an overlapping portion of right and left images. Referring to FIG. 10, a region OL is a left side portion outside the overlapping portion. The region OL corresponds to the image data compensation value of a left image which is output as combined data from the image data compensating portion 526L. A region OR is a right side portion outside the overlapping portion. The region OR corresponds to the image data compensation value of a right image which is output as combined data from the image data compensating portion 526R.

Referring to FIG. 10, a region IL is the left side portion of an object in the overlapping portion. This region IL corresponds to the image data compensation value of a left image which is output as combined image data from the image data compensating portion 526L. A region IR is the right side portion of an object in the overlapping portion. This region IR corresponds to the image data compensation value of a right image which is output as combined image data from the image data compensating portion 526R.

With regard to the overlapping portion, the average value of the image data compensation value of the left image, output from the image data compensating portion 526L, and the image data compensation value of the right image, output from the image data compensating portion 526R, is output as combined image data. At this time, the result obtained by the corresponding point extracting portion 523 is used for determination of the above regions.

More specifically, a region whose corresponding points are detected is determined as an overlapping region. If no corresponding points are detected, a region (occlusion portion) other than the overlapping portion is determined. The left side portion outside the overlapping portion is the region OL. The right side portion outside the overlapping portion is the region OR. The left and right side portions of the object in the overlapping portion are the regions IL and IR, respectively. In this case, image data obtained by an image taking system at a position where the region of a far-distance portion which is concealed by a near-distance object is minimum according to the distance information is treated as image data for the object portion. By performing such image combining processing, actual phototaken images are used mostly, and hence an accurate image close to an actual object can be obtained by combining processing.

With regard to a region other than the overlapping portion, although the distance information Z used for coordinates changing processing cannot be obtained because no corresponding points are extracted, background distance information is used instead.

Figure 6:
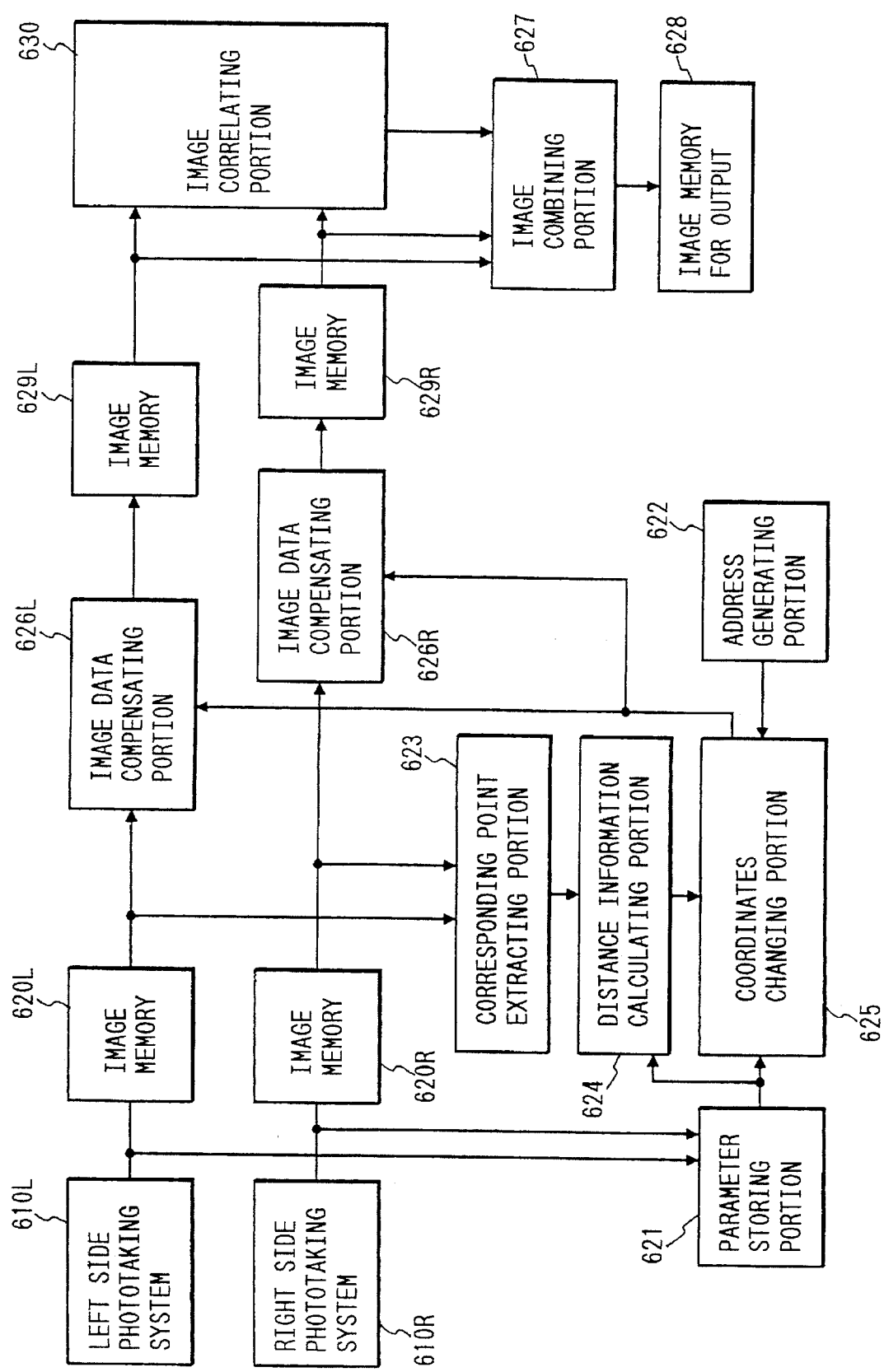
FIG. 6 is a block diagram showing the arrangement of an image combining/changing processing portion in the second embodiment of the present invention.
Figure 7:
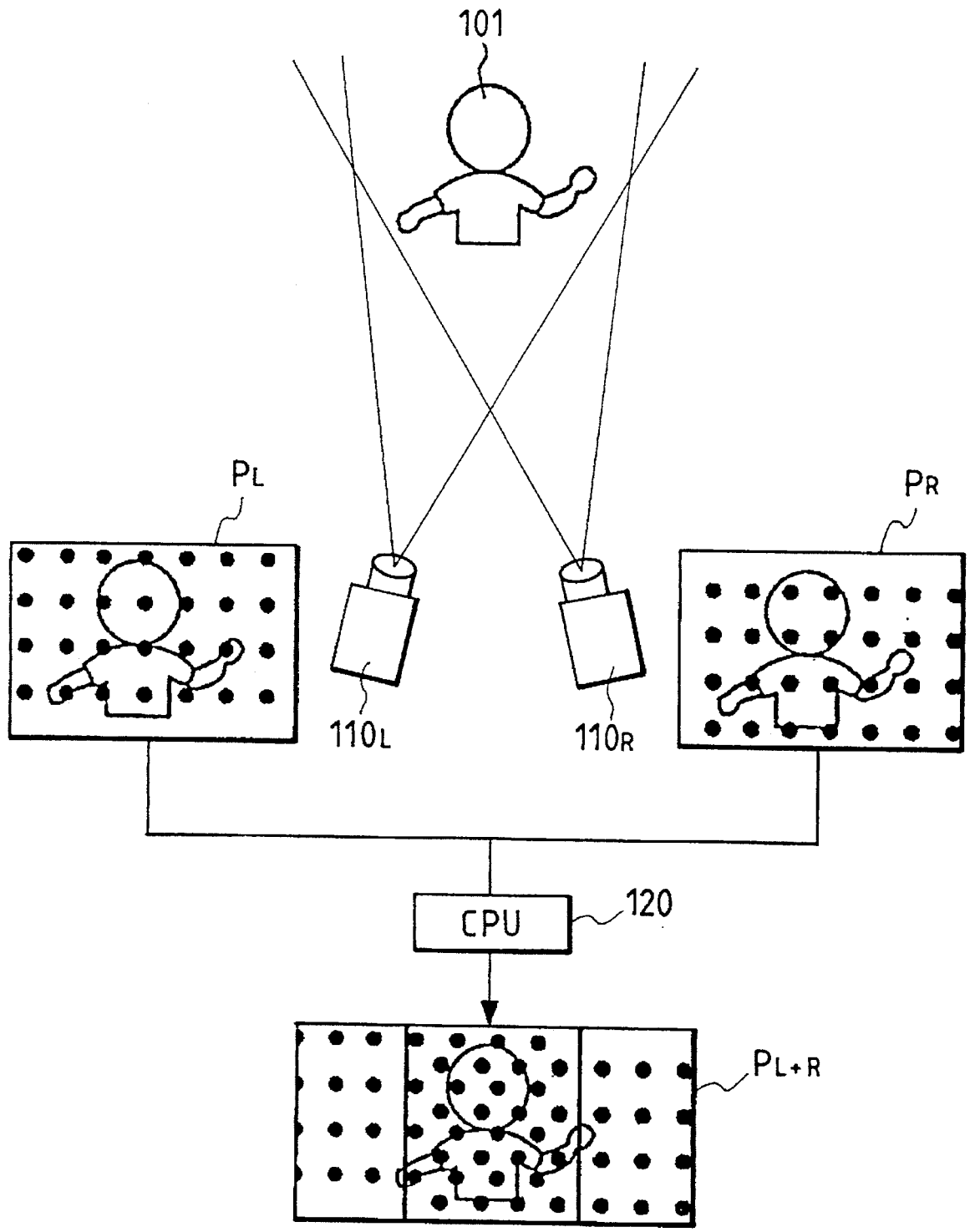
FIG. 7 is a view showing the concept of a multi-eye image pickup apparatus for forming an image having an arbitrary aspect ratio by combining two images obtained by phototaking one object to be taken using two image taking systems with portions of the fields of view overlapping each other.

The second embodiment of the present invention will be described next. FIG. 6 shows the arrangement of an image combining apparatus according to the second embodiment of the present invention. A left side image taking system 610L, a right side image taking system 610R, image memories 620L and 620R, a parameter storing portion 621, an address generating portion 622, a corresponding point extracting portion 623, a distance information calculating portion 624, a coordinates changing portion 625, image data compensating portions 626R and 626L, an image combining portion 627, and an image memory 628 for output in FIG. 6 respectively perform the same operations as those of the left side image taking system 510L, the right side image taking system 510R, the image memories 520L and 520R, the parameter storing portion 521, the address generating portion 522, the corresponding point extracting portion 523, the distance information calculating portion 524, the coordinates changing portion 525, the image data compensating portions 526R and 526L, the image combining portion 527, and the image memory 528 for output shown in FIG. 5. Therefore, a description of these portions will be omitted.

This embodiment is different from the first embodiment in that the image combining portion 627a uses an output from an image correlating portion 630 to perform region determination. This portion will be described below.

Outputs from the image data compensating portions 626L and 626R are temporarily stored in image memories 629L and 629R, respectively. The values stored in the above two image memories are divided into small regions, and the similarities of the respective small regions are obtained and compared by the image correlating portion 630. When the correlation value is larger than a predetermined value, it is determined that the contents in the two image memories are identical. If this correlation value is smaller than the predetermined value, a region where a far-distance portion is concealed by a near-distance object is determined.

The image combining portion 627 outputs the average value of compensated image data stored in the image memories 629L and 629R as combined image data as a result of processing for the overlapping portion only when it is determined that the contents of the two image memories are identical. Processing other than the above processing is the same as that in the image combining portion in the first embodiment. In this case, the compensated image data stored in one of the image memories 626L and 626R is output as combined image data in the following manner. First of all, the correlation values between adjacent small regions and an image are calculated in each of the image memories 629L and 629R, and data having a higher correlation value is selected as data having a smoothly compensated background image. According to the method of selecting a compensated image by using correlation values in this embodiment, even if corresponding point extraction processing is not completely performed, an image having little distortion can be provided as an output image.

In addition, for region determination in the image combining portion 627, the scheme of using the result obtained by the corresponding point extracting portion 623 in the first embodiment may be used in combination with an output from the image correlating portion 630. In this case, a compensated image can be selected more reliably to reduce a portion exhibiting a deterioration in image quality upon overlapping of an object portion and a background portion.

What is claimed is:

1. An image combining method for image-taking an object by using a plurality of image taking systems, and forming combined image information by combining pieces of image information obtained by said image taking systems, comprising the steps of:

extracting corresponding point information between the pieces of image information;

calculating distance information by using optical information in each of said image taking systems and the corresponding point information;

sequentially generating two-dimensional coordinates of a display image based on the combined image information;

changing the two-dimensional coordinates to two-dimensional coordinates of each piece of image information by using the optical information and the distance information;

performing compensation processing for each piece of image information on the basis of the changed two-dimensional coordinates for each piece of image information;

determining an occlusion portion in which a far-distance portion of the object is concealed by a near-distance portion, of an overlapping region of images on the basis of the corresponding point information; and selecting one of pieces of compensated image information with respect to the occlusion portion in forming combined image information by combining the pieces of compensated image information.

2. A method according to claim 1, wherein the step of selecting compensated image information with respect to the occlusion portion includes the step of selecting compensated image information exhibiting the least occlusion portion, of the pieces of compensated image information.

3. An image combining apparatus for image-taking an object by using a plurality of image taking systems, and forming combined image information by combining pieces of image information obtained by said image taking systems, comprising:

corresponding points extracting means for extracting corresponding point information between the pieces of image information;

distance information calculating means for calculating distance information by using optical information in each of said image taking systems and the corresponding point information;

address generating means for sequentially generating two-dimensional coordinates of a display image based on the combined image information;

coordinates changing means for changing the two-dimensional coordinates to two-dimensional coordinates of each piece of image information by using the optical information and the distance information;

image information compensating means for performing compensation processing for each piece of image information on the basis of the changed two-dimensional coordinates for each piece of image information;

determining means for determining an occlusion portion in which a far-distance portion of the object is concealed by a near-distance portion, of an overlapping region of phototaken images on the basis of the corresponding point information; and selecting means for selecting one of pieces of compensated image information with respect to the occlusion portion in forming combined image information by combining the pieces of compensated image information.

4. An apparatus according to claim 3, wherein in selecting compensated image information with respect to the occlusion portion, compensated image information exhibiting the least occlusion portion is selected from the pieces of compensated image information.

5. An apparatus according to claim 3, further comprising image correlating means for dividing each compensated image information into small regions, and determining an occlusion portion in accordance with a similarity between corresponding small regions of the respective pieces of compensated image information.

6. An apparatus according to claim 5, wherein in selecting compensated image information with respect to the occlusion portion, compensated image information exhibiting the least occlusion portion is selected from the pieces of compensated image information.

* * * * *